United States Patent [19]

D'Andrade et al.

[11] 4,340,373
[45] Jul. 20, 1982

[54] SPELLING MACHINE

[75] Inventors: Bruce M. D'Andrade, Whitehouse Station, N.J.; Kwok W. Tsui; Sing C. J. Yuen, both of Hong Kong, Hong Kong

[73] Assignee: Arco Industries Ltd., Hong Kong, Hong Kong

[21] Appl. No.: 253,892

[22] Filed: Apr. 13, 1981

[51] Int. Cl.³ .............................................. G09B 1/20
[52] U.S. Cl. ..................................... 434/174; 434/345
[58] Field of Search ............... 434/167, 172, 173, 174, 434/343, 345

[56] References Cited

U.S. PATENT DOCUMENTS

| | | | |
|---|---|---|---|
| 792,801 | 6/1905 | Steele . | |
| 1,256,224 | 2/1918 | Habart | 434/174 |
| 1,619,160 | 3/1927 | Steele . | |
| 1,902,971 | 3/1933 | Rippon . | |
| 2,200,206 | 5/1940 | Myers | 434/173 |
| 2,213,411 | 9/1940 | Ripon . | |
| 2,340,251 | 1/1944 | Nesbit | 434/345 |
| 2,499,323 | 2/1950 | McCash | 44/169 |
| 2,586,564 | 2/1952 | Rinde . | |
| 3,318,023 | 5/1967 | Myers . | |
| 3,593,431 | 7/1971 | Candido et al. . | |
| 3,758,961 | 9/1973 | Matsumoto | 434/345 |

Primary Examiner—William H. Grieb
Attorney, Agent, or Firm—C. Hercus Just

[57] ABSTRACT

A spelling machine includes a housing having a row of drums on a shaft and is provided with a series of evenly spaced letters on the drums viewable through a row of holes in the housing. A row of slides in the forward portion of the machine has lugs and stop members respectively on opposite end portions. A series of cards each having a different picture thereon is inserted into the machine. Each card is provided with a row of holes spaced predetermined distances from an edge of the card which is parallel to the shaft when the card is inserted in the machine. The holes respectively receive the lugs on the slides and are operable to move the slides and stops thereon toward the drums various distances corresponding to letters respectively on the drums when the drums are rotated from starting position in one direction. Rotation limiting elements on the drums engage with the stop members on the slides to dispose the drums with a letter on each drum showing through each of the holes in the housing and spelling the name of the object on the card. The housing includes structure to rotate the drums in the opposite direction back to the starting position.

17 Claims, 9 Drawing Figures

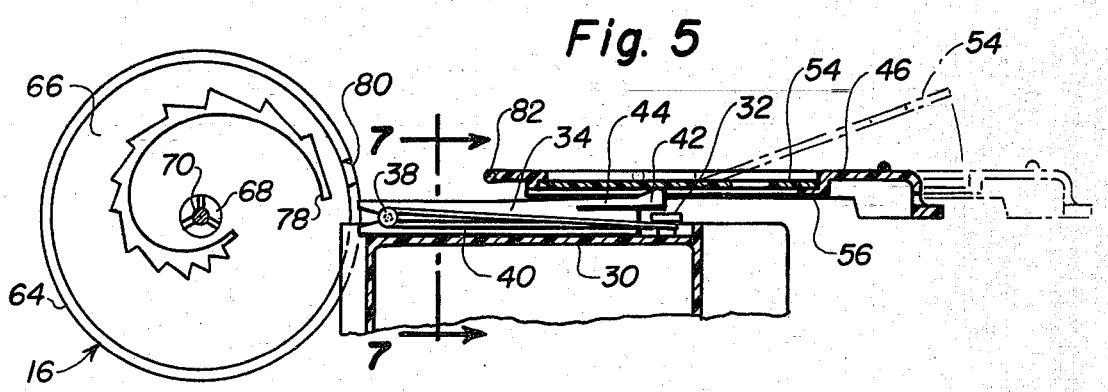
Fig. 5
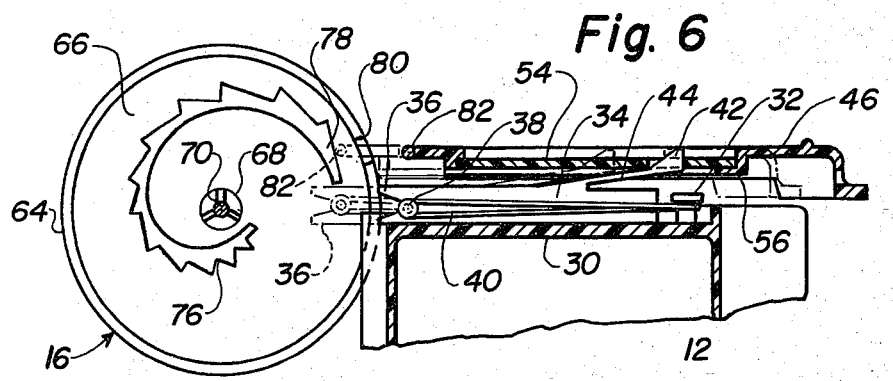
Fig. 6
Fig. 8
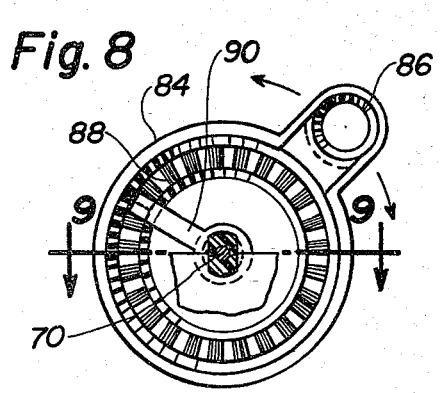
Fig. 7
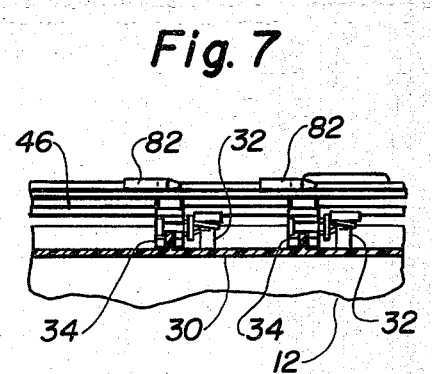
Fig. 9
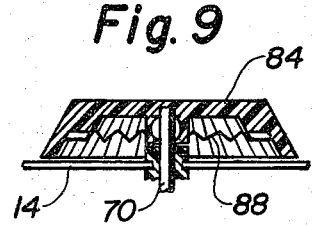

SPELLING MACHINE

BACKGROUND OF THE INVENTION

The present invention is directed to a spelling machine by which young children may begin to learn to spell certain simple words, especially the names of familiar objects, such as animals and the like. Machines for this purpose have been developed in various forms substantially from the beginning of the present century or even earlier. Some of the devices have cards or blocks having individual letters and a projection thereon for insertion into a machine, and when a correctly-spelled name of an article is arranged by such blocks in the machine, a picture of that article, such as a dog, will appear in an opening in a front wall of the machine. Such a device is shown in prior U.S. Pat. No. 792,801 to Steele, dated June 20, 1905. A related version by the same patentee is found in U.S. Pat. No. 1,619,160, dated Mar. 1, 1927, but instead of cards, knobs fixed to wheels upon which letters are formed may be rotated to dispose certain letters in the front of openings in the front panel of the machine, whereby if the name of the article is spelled correctly, the picture of the article will appear through said opening in the front wall.

Another version of a spelling machine is found in U.S. Pat. No. 2,213,411 to Rippon, dated Sept. 3, 1940, and in which a plurality of rows of holes each having a letter adjacent the same is arranged for plugs to be inserted in a selected hole opposite a chosen letter and a control row of holes is provided with slots, whereby if, after placing the plugs in desired holes and the plug opposite the slot is moved, the correctly spelled name, as well as a picture of the object, will appear in openings provided in a wall of the machine.

A very common form of prior device is one which employs cards upon which pictures of items or articles, such as animals are shown, and said cards have a series of prongs thereon, whereby when the card is inserted in the machine, it moves movable members upon which letters are printed and the full insertion of the card will result in the movable members being moved to expose letters thereon spelling the correct name of the item in a slot or row of holes in which the desired letters may be seen. Examples of this type of spelling machine are found in the prior U.S. Patents listed below:

| 1,902,971 | Rippon | March 28, 1933 |
| 2,586,564 | Rinde | Feb. 19, 1952 |
| 3,593,431 | Candido et al | July 30, 1971 |

One additional type of machine similar to the ones immediately discussed above which employs cards to be inserted in the machine is shown in U.S. Pat. No. 3,318,023 to Myers, dated May 9, 1967, and in which the cards are provided with rivets which are bridging members in electric circuits and finger-engageable knobs on slides are movable in slots to expose desired letters spelling the name of the article shown on the card and if correctly spelled, a signal or some other type of indicating means is activated.

Especially for purposes of employing cards in a spelling machine to operate the same to spell the name of articles appearing on the cards and obviate certain difficulties arising from the previously developed spelling machine, such as prongs extending from one edge of the same, or applying electrical bridging members thereto, such as rivets, as well as otherwise facilitating the operation of the machine, the present invention has been developed having the distinguishing characteristics described below, which are patentable over the prior devices, as follows:

SUMMARY OF THE INVENTION

It is among the principal objects of the invention to provide a spelling machine in which a series of drums are mounted rotatably in side-by-side relation and having letters evenly spaced circumferentially around the periphery thereof for exposure of the letters through a row of holes in a housing enclosing said drums, movement of the drums to dispose letters spelling the name of an article on a card being controlled by holes or perforations in the card, which are spaced predetermined distances from one edge thereof, for example, and slides respectively engageable with said perforations are provided with stop means on the opposite ends within the housing are arranged to engage rotation limiting means on said drums corresponding respectively to letters on said drums and, upon rotating said drums in one direction, they will be stopped respectively with the desired letter, as dictated by the locations of the perforations in the cards, being disposed opposite one opening of a row thereof in the housing, all of said letters spelling the name of the article or item depicted upon the card, whereby as distinguished from certain of the prior devices, no knowledge of spelling the names of such articles is required.

Another object of the invention is to mount said drums upon a shaft in rotatable manner but having frictional engagement therebetween, whereby rotation of the shaft will rotate said drums until individual movement thereof is stopped in accordance with the stop means referred to above, but other drums which have not had their rotation limiting means engage a stop, may continue to move until such stopping occurs.

A still further object of the invention is to actuate said shaft for the drums by means of a hand-operated crank and said shaft being rotatable in opposite directions, one direction being to move the drums to name-spelling position, and reverse movement of the shaft restoring the drums to initial position, said drums further being provided with means to prevent the withdrawal of a card from the machine until all of the drums have been returned to starting position.

Still another object of the invention is to provide said drums with additional stop members engageable with a starting reference member on the housing and thereby cease such reverse rotation of the drums to starting position but the crank being continuously rotated in such reverse direction until all of the drums have been returned to starting position.

Still another object of the invention is to provide within the drums rotation limiting means in the form of a snail-like member of stepped portions respectively corresponding to the letters on the periphery of the drums, said stepped portions being progressively spaced successively greater radii from the axis of the shaft of the drum and such progressively spaced stepped portions extend between opposite ends of said snail member.

One other object of the invention in conjunction with the foregoing objects, is to provide said frame with substantially horizontal parallel guideways for the slides disposed in the forward portion of the frame, each slide having resilient means supporting a lug on the slide in an upward position from which it is depressed by a card upon insertion of the card in the machine, whereby said resilient means urges the lug into the opening in a card to be engaged by said lug and insures interengagement of said slide with a card.

A further object of the invention ancillary to the object set forth immediately above is to provide a tray slidably supported above said slides and having a recess to receive one of said aforementioned cards, a guideway on said frame for said tray to direct the same from the forward position of said frame to an inserted position within said housing, stop means in said housing to limit the insertion of said tray and card thereon and also project said slides into the interiors of said drums to position the leading ends of said slides in readiness to engage a step portion in said slide corresponding to a letter respectively on said drums as dictated by the perforations in said cards when said drums are rotated in forward direction, and the inner ends of said slides when inserted as aforesaid comprising stop means for said drums when reversely rotated in return direction to establish the same in starting position.

One further object of the invention is to provide the machine with lock means operating between said aforementioned slides and drums, said lock means being operable to prevent return of the slides to starting position until said drums have been reversely rotated to the initial starting position thereof, whereby only at such time may the card be moved in retracting direction to starting position.

Still another object of the invention is to provide said drums in the form of a cylindrical rim and said aforementioned lock means to prevent premature return of the cards and slides to initial position comprising a notch in the cylindrical rim of said drum through which forward projections on the inner end of said card tray extend respectively and said projections extending laterally for engagement with the inner surface of said cylindrical rim of the drum to prevent withdrawal of said tray and slides in engagement with said card until the drums have been reversely moved to initial starting position and the housing of said machine also including cover means for the portion of said cards having said openings therein, said cover means preventing removal of the cards after insertion thereof to fixed stop means within the machine for the tray.

Still another object of the invention is to provide said drums with hubs frictionally engaging said shaft, said shaft being rotatably supported by said frame within bearings in side members of the frame for rotation of the drums in forward and return directions relative to the desired movements of said drums, thereby insuring movement of the drums in foward and return directions, as desired, until said drums have respectively been stopped by the function of their rotation limiting means or the drums have reached starting position when the shaft moves the same in return direction.

Another object of the invention is to provide cards which preferably have different pictures of objects respectively on opposite surfaces thereof and sets of perforations in said cards respectively pertaining to said pictures are spaced in different locations on the cards so as not to interfere with the spelling function related to each picture.

Details of the foregoing objects and of the invention, as well as other objects thereof, are set forth in the following specification and illustrated in the accompanying drawings comprising a part thereof.

BRIEF DESCRIPTION OF THE DRAWINGS

FIG. 5 is a view similar to FIG. 4 but fragmentary and simplified, the card-supporting tray being illustrated thereon in partially inserted position and, in phantom, the outer end thereof being shown in outermost, initial position and the card being shown in angular position.

FIG. 6 is a view similar to FIG. 5 but showing the card-supporting tray nearly completely inserted and one of the slides actuated thereby likewise being in nearly completed inserted position and illustrated in full lines, while the forward ends of said tray and slide are shown in phantom in fully inserted position.

FIG. 7 is a fragmentary vertical section showing a detail of the structure, as seen on the line 7—7 of FIG. 5, particularly to show certain locking members on said tray.

FIG. 8 is a vertical sectional view showing a crank for rotating the drums and operating a noise-generating device, as seen on the line 8—8 of FIG. 3.

FIG. 9 is a fragmentary vertical sectional view as seen on the line 9—9 of FIG. 8.

DETAILED DESCRIPTION OF THE PREFERRED EMBODIMENTS

Figure 4:
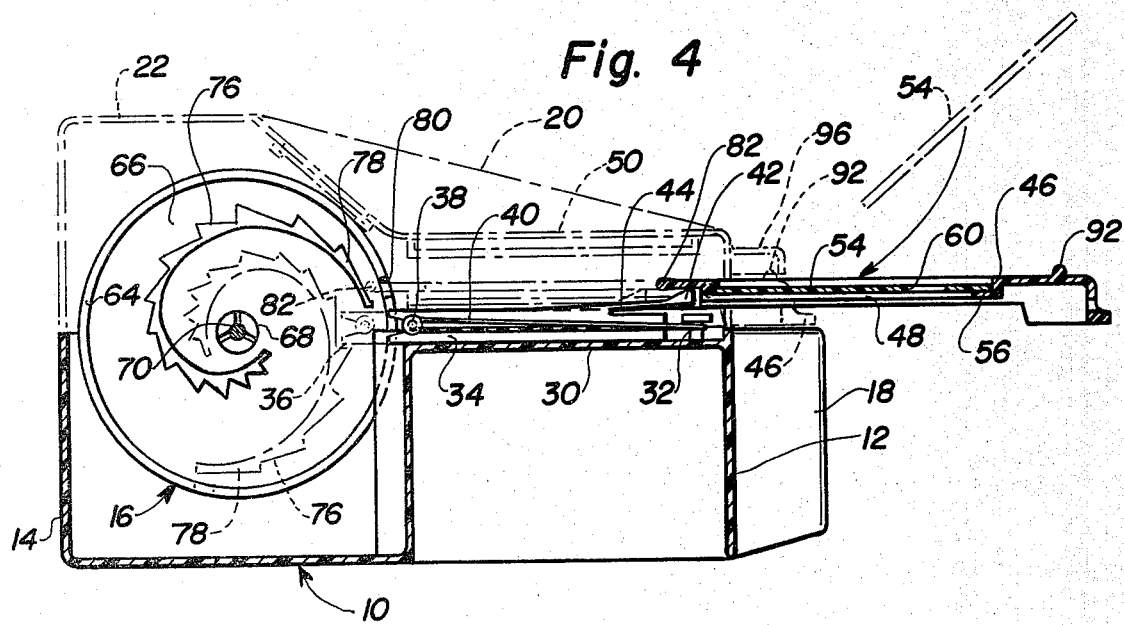
FIG. 4 is a vertical sectional view, as seen on the line 4—4 of FIG. 3, and showing the card-supporting tray in fully extended, initial position and, in phantom, the side elevation of a card is shown above the tray to be positioned thereon.

Insofar as possible, the interrelated and connected elements comprising the toy spelling machine of the invention are preferably formed by molding plastic material which, at least for most of the components, is of a rigid nature, but certain limited elements being somewhat flexible. The machine has a shell-like base 10 comprising a forward portion 12 and a rearward portion 14, the latter being rectangular in shape for supporting the lower portions of a plurality of drums 16, as best shown in FIG. 4. The forward portion 12 has a pair of ribs 18 extending forwardly therefrom to serve as supporting means for engagement with a horizontal surface when the machine is in idle position.

Figure 1:
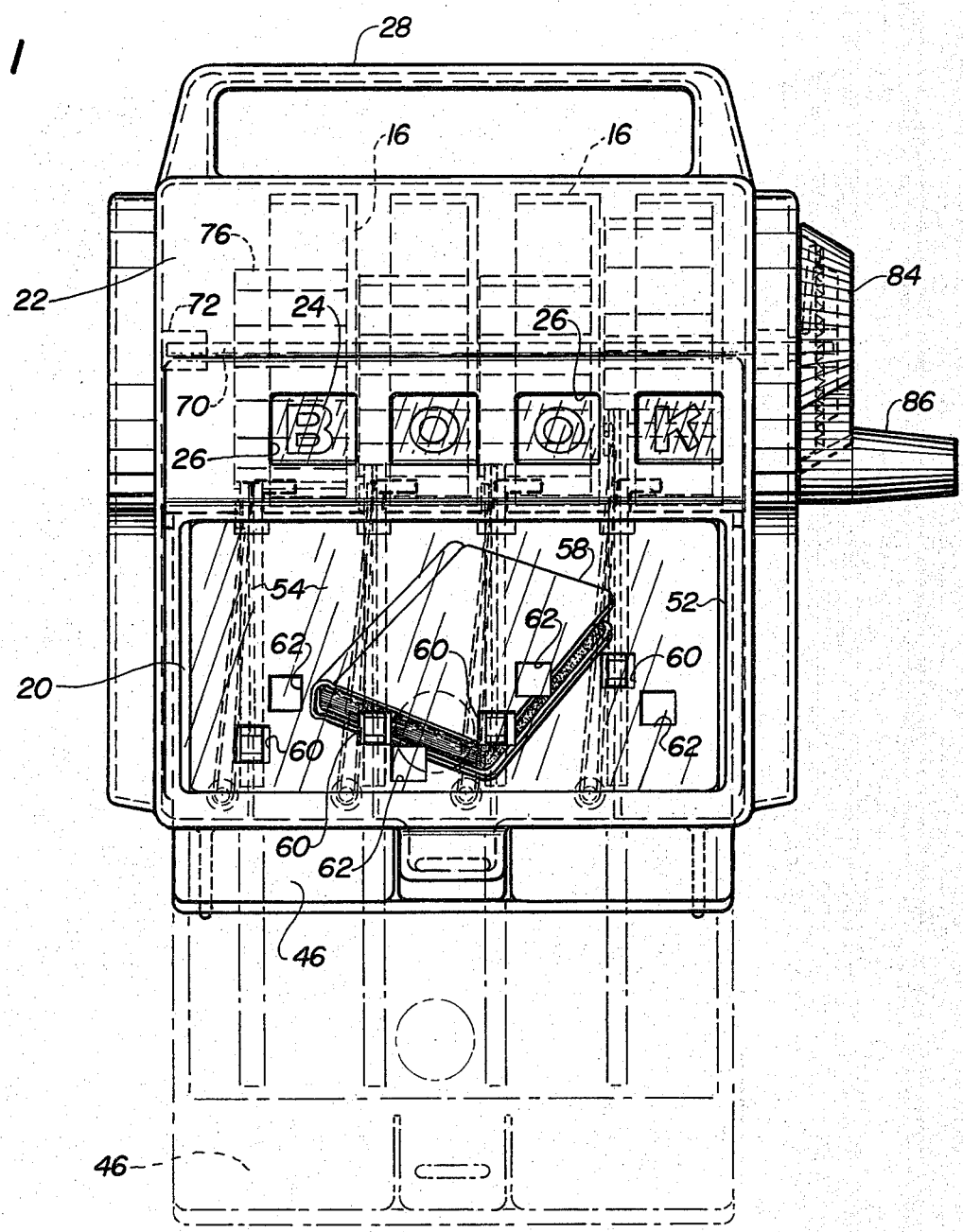
FIG. 1 is a top plan view of a toy spelling machine embodying the principles of the present invention and including a card-supporting slidable tray illustrated in full lines in nearly completed insertion into the machine, and in phantom, illustrating the fully retracted or withdrawn position of said tray.
Figure 2:
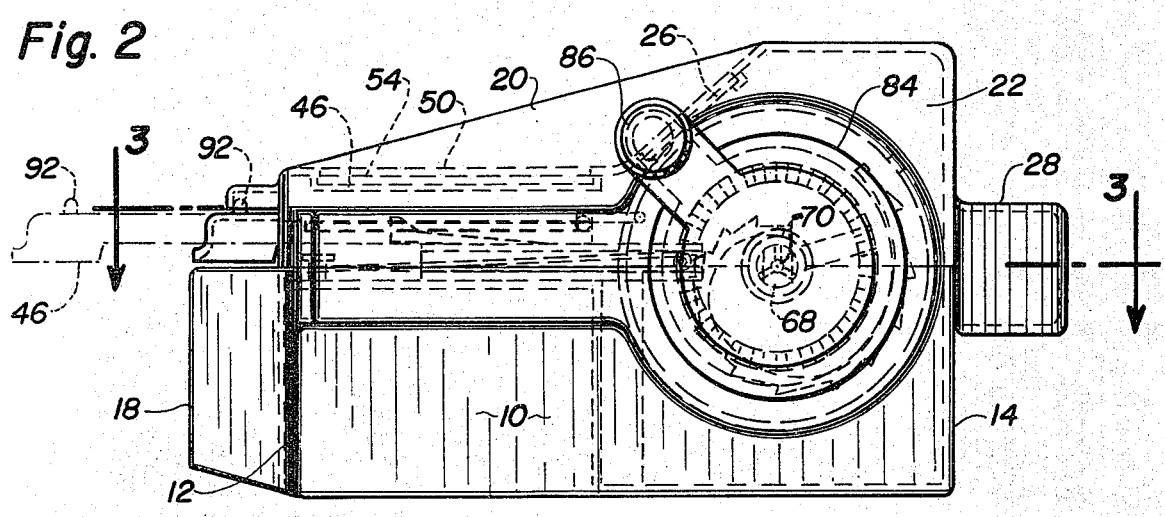
FIG. 2 is a side elevation of the toy spelling machine shown in FIG. 1.
Figure 3:
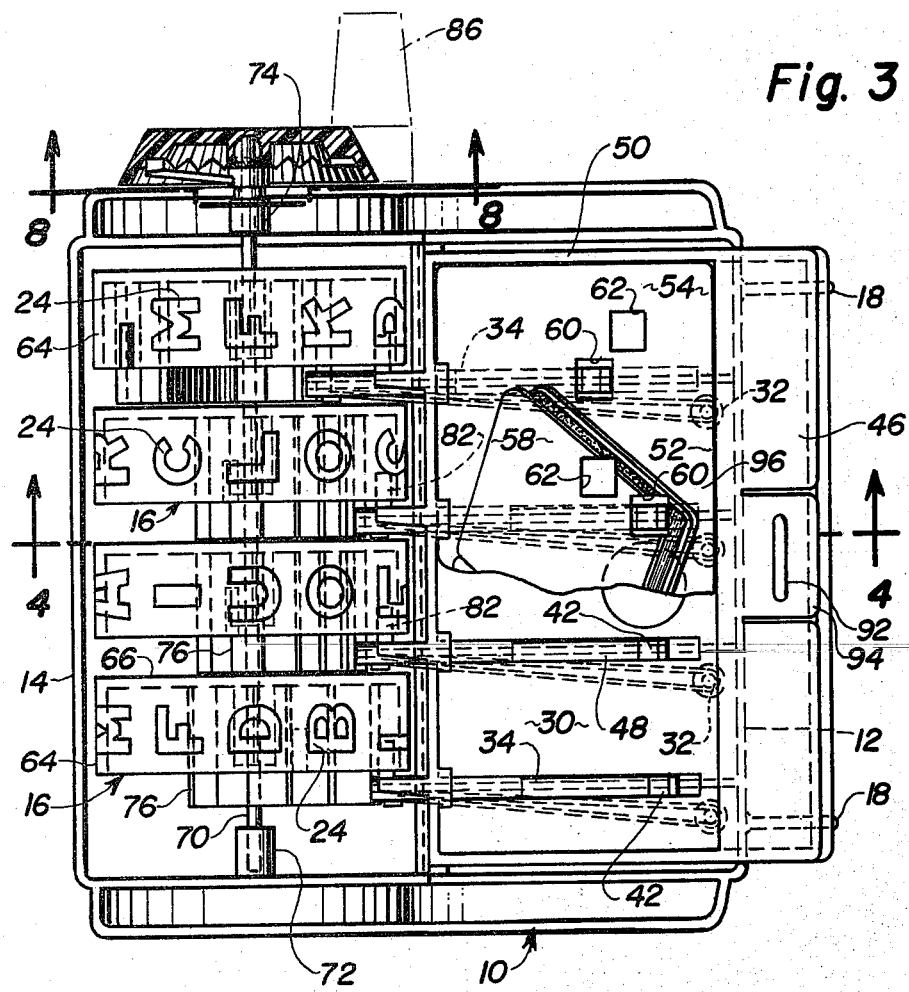
FIG. 3 is a top plan view of the toy spelling machine shown in FIG. 1, with the upper portion of the housing removed to illustrate details of the drums and other mechanism on the interior of said housing, a portion of the card-supporting tray being broken away to illustrate further details of the mechanism, said view being taken on the line 3—3 of FIG. 2.

Referring to FIGS. 1 and 2, it will be seen that the upper portion of the base 10 is engaged by a top cover 20 having a rearward portion 22 which, as shown in FIG. 2, and also in phantom in FIG. 4, encloses the upper portions of the drums 16 which, as shown in FIG. 3, particularly, respectively have rows of letters 24 formed thereon for purposes of spelling a word when the machine is operated in the manner described below. For purposes of observing the letters which spell the word, the rearward portion 22 of the top cover is provided in the forward portion thereof with a plurality of similar openings 26, best shown in FIG. 1, through which the letters 24 are viewable. As shown in FIGS. 1 and 2, the rearmost wall of the rearward portion 22 of top cover 20 is provided with a handle member 28, preferably molded integrally with the top cover and as seen in FIG. 2, partly extending downwardly over the upper portion of the rear wall of the rearward portion 14 of base 10 and arranged for readily carrying the machine, as well as handling it to position the same operatively.

Referring particularly to FIG. 4, the forward portion 12 of base 10 has a horizontal, flat supporting surface 30 upon which adjacent the forward edge thereof, a series of headed pins 32 are fixed, the surface 30 supporting a plurality of slides 34 in transversely-spaced, parallel relationship to each other, as best shown in FIG. 3. Said slides are supported for slidable movement to the left, as viewed in FIGS. 3 and 4, into operative position from the starting position, shown in full lines in FIG. 4, and projectable to said operative position shown in phantom in FIG. 4 and in which position the forward ends 36 of the slides comprise stop means, the function of which is described below. Said forward ends also each have extending laterally therefrom another headed pin 38. Extending around and between the headed pins 32 and 38 is an elastic loop member, such as a rubberband, comprising return means 40, by which the slides 34 are returned to the initial starting position shown in full lines in FIGS. 4, 5 and 6 from the projected or inserted operative position, shown in phantom in FIGS. 4 and 6.

Each of the slides, which are similar, have elastically supported thereon card-engageable projections 42, which are integral with the slides and also have an angular cam face thereon extending downwardly and rearwardly toward the drums 16, for purposes to be described. For simplicity, the slides 34 may be made from resilient plastic material in order to provide a flexible leaf 44 extending from the main body of the slide and being integral with the projection 42 on the outer end of said leaf. It also will be understood that other types of return means 40 may be employed in lieu of rubberbands, as long as the same are capable of restoring the slides to the initial starting position thereof, shown in full lines in FIGS. 4–6.

The machine also includes a flat, horizontal tray 46, which is provided with a plurality of transversely-spaced, parallel slots 48 therein, and within which the projections 42 on the slides 34 are slidable when said tray is moved from the extended position, shown in FIG. 4, for example, to the fully inserted position, shown in FIGS. 1–3, and in which position the tray 46 is disposed below forward portion 50 of the top cover 20, but said portion having a window opening 52 therein, best shown in FIGS. 1 and 3, through which a card 54 is viewable. The card is disposed within a very shallow recess extending downward from the upper surface of the tray 46 and the edges of the card rest upon a rim portion 56 defining the bottom of said recess, as best shown in FIGS. 4–6.

A set of cards 54 are provided with the machine respectively showing the picture of an object having a name composed of letters capable of being formed by the letters on the complement of the drums 16. As specifically illustrated, especially in FIGS. 1 and 3, there are four drums illustrated, but it is to be understood that a lesser or greater number of drums within reason could be utilized if desired. For simplicity however, and especially to select a limited number of objects to be depicted upon the cards, it has been found that words of four letters, which require the use of four drums, is advantageous and convenient, but without limitation thereto. The card illustrated in FIGS. 1 and 3 shows a book 58 and the example of operation described in detail below is for purposes of displaying letters comprising the name "BOOK", which letters are shown in alignment in FIGS. 1 and 3 within the openings 26, as seen in FIG. 1, whereby the word displayed in said openings corresponds with the picture on the card. In order to cause said letters to be displayed to form the name of the objects shown on the card, as illustrated, the card 54, as shown in FIGS. 1 and 3, has a plurality of similar perforations 60 formed therein in predetermined locations commensurate with the arrangement of letters on the drums 16, which arrangement on respective drums may be different, depending upon the words to be spelled by the machine for the objects appearing on the set of cards furnished therewith.

For purposes of minimizing the number of cards which must be furnished, but nevertheless, provide for the spelling of a greater number of objects, the cards 54 respectively are provided with pictures of different objects on opposite surfaces and this necessitates the forming of a different predetermined arrangement of perforations 62, as shown in exemplary manner in FIGS. 1 and 3.

The drums 16 each have a cylindrical periphery 64 upon the outer surface of which the aforementioned letters are formed uniformly. The peripheral surfaces 64 project from one side of the rim of a disc 66 and centrally of said discs 66 of each drum is a hub 68 of generally cylindrical nature but radially slotted and formed with a central bore of a slightly smaller diameter than the shaft 70 upon which the drums are all frictionally supported by means of the fingers of the hub formed by the radial slots but the frictional engagement of the hub with respect to the shaft being arranged to permit slippage under certain conditions described hereinafter. Accordingly, the inherent resilience of the relatively stiff plastic material from which the drums 16 are formed is capable of permitting such frictional engagement of the hubs with the shaft 70. Especially from FIGS. 1 and 3, it also will be seen that the drums 16 are supported in spaced relationship to each other in an even arrangement upon the shaft 70, the opposite ends of which are suitably supported within bearing members 72 and 74, formed in sidewalls of the shell-like base 10, as best shown in FIG. 3.

One of the very important features of the present invention comprises the rotation-limiting means on the drums which are in the form of a snail configuration 76, preferably integrally molded upon the discs 66 of the drums 16 and extending radially beyond the outer edge of the cylindrical peripheries 64 of the drums 16, as shown in phantom manner in FIG. 1, and also in full lines in FIG. 3. The rotation-limiting snails 76 have uniformly stepped portions or faces respectively corresponding to the letters on the periphery of each drum and progressively spaced successively greater radii from the axis of the shaft 70 between the opposite ends of the snail 76, as clearly shown in FIGS. 4–6. The outermost ends 78 also comprise stop means operable incident to restoring the drums 16 to initial starting position following the exercise of the same spelling a word, as described hereinafter. Further, the peripheral, cylindrical rims 64 of the drums 16 are provided at a strategic location with respect to the ends 78 of the snails 76 with a notch 80, see FIGS. 4-6, for purposes to be described incident to locking the tray 46 and the card therein against retracting movement to starting position until all of the drums have been moved to starting position, which is the one shown particularly in FIGS. 4-6.

Referring particularly to FIGS. 1 and 4, it will be seen that the innermost edge of the tray 46, which is nearest the drums 16, as shown in FIG. 4, is provided with projections terminating in laterally extending locking members 82 which, when the tray 46 is projected toward the drums 16, will extend through the strategically located notches 80 in the rims of the drums 16, as shown in FIGS. 4 and 6, in phantom, whereby upon rotation of the drums counterclockwise, as viewed in FIGS. 4-6, explained in detail hereinafter, the projections 82 will be capable of engaging the inner surfaces of the cylindrical rims 64 of the drums 16 and prevent retraction of the tray 46 from its inserted position, shown in phantom in FIGS. 4 and 6, and also in FIG. 3 in full lines.

Mounted on one end of shaft 70 is the base 84 of crank member 86, the base 84 comprising part of a noise-generating mechanism, best illustrated in FIGS. 8 and 9, the interior of the base 84 having radial serrations 88 therein somewhat in cup-like manner, and engageable with a fixed flexible finger 90, having an inner end surrounding the shaft 70 and otherwise fixed against rotation relative to the sidewall of the base 10.

OPERATION OF THE MACHINE

When the machine is in idle position, the tray 46 is in fully inserted position, as shown in full lines in FIG. 2, for example. To start the operation, the tray is pulled outward, such as to the full line position shown in FIG. 4, and a card 54 is inserted in the shallow recess in the tray. Inward movement of the tray is then commenced and meanwhile, the slots 48 in the tray 46 permit the sliding of the tray relative to the projections 42 until the holes 60 in the card 54 reach the location of the projections 42 and said projections then will snap into the holes in such manner that continued movement of the tray and card will then project the slides 34 inwardly, whereby the slides will enter the spaces between the adjacent drums 16 until the inner ends of the slides 34, which comprise stop members are disposed at certain positions within the space shown in FIG. 4 between the hub 68 and the outer end 78 of the snails 76. When the tray 46 has been fully inserted to the position shown in phantom in FIG. 4, the lateral projections 82 on the inner edge of the tray 46 will have passed through the notches 80 in the drums 16 and, as indicated, the inner ends of the slides which comprise stop members, will be located at different positions within the confines of the drum peripheries and, in general, at different radial distances from the axis of the shafts 70. Such location of the slides is dictated by the arrangement of the holes 60 in the card 54. Then the crank 86 is rotated to turn the drums 16 counterclockwise as viewed in FIGS. 4-6, or clockwise as viewed in FIG. 2, and the rotation of each drum will continue in that direction until one of the steps on the snail 76 in each drum engages the stop members comprising the inner ends of the slides 34. Continued rotation of the shaft by the crank 86 ultimately will dispose all of the drums in engagement with one of the steps or step surfaces in the snails 76 of each drum, but it will be understood that such rotation of the drums will continue, following the stopping of certain ones until all of the drums have been stopped. At that time, letters displayed by the drums in the openings 26 in the housing should spell the name of the object shown on the card, and by way of example, the same will appear as the word "BOOK", illustrated especially in FIG. 1, and also in FIG. 3. At this time, removal of the card from the machine is impossible, due to the fact that the tray 46 is locked in its inner position by means of the laterally extending locking members 82 on the inner end of the tray, and as indicated in the foregoing, the abovedescribed nature of the hubs 68 permits slippage of the drums relative to the shaft during such continued rotation of the shaft to dispose all of the drums in the desired position controlled by the holes in the card 54.

Following the spelling of the word as described, the crank 86 then is rotated in reverse direction and the frictional engagement of the hub 68 with the shaft 70 will carry the drums sequentially in clockwise direction, as viewed in FIGS. 4-6, until the outer ends 78 of each of the snails 76 engage the inner or forward ends 36 of the slides 34, which are disposed in the phantom position shown in FIGS. 4 and 6, and thereby stop each drum in its starting position as the same reach said position and continued rotation of the shaft by the crank 86 ultimately will restore all of the drums in the starting position, and in which position the tray 46 then may be moved to extended position due to the fact that the locking members 82 may be removed through the notches 80 in the drums and the card 54 may be removed from the tray 46.

Especially for purposes of preventing accidental movement of the tray 46 from its fully inserted position, under conditions where it has been stored as shown in full lines in FIG. 2, and considering the fact that the return means 40 tend to move said tray outwardly, latching means are provided in the form of a rib 92 formed on the upper surface of a flexible tongue 94 formed in the outermost portion of the tray 46, and when the tray is fully inserted, it will be seen that the rib 92 is disposed in latching position relative to the forward overhang 96 of the forward portion 50 of the top cover 20, as shown in phantom in FIGS. 2 and 4. Simply by depressing the tongue 94, the latching rib 92 may be moved from beneath the overhang 96 and permit the tray 46 to extend to its outermost position in which it can receive a card 54. However, when the tray 46 is fully inserted into the machine, it is not possible to remove the card 54 therefrom due to being covered by the forward portion 50 of the top cover 20 in which the viewing window 52 is located.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

We claim:

1. A spelling machine comprising in combination, a frame having forward and rearward portions, a shaft extending between opposite sides of said frames in the rearward portion of said frame, a plurality of drums mounted side-by-side upon said shaft and each having a row of letters on the periphery thereof, a housing enclosing said drums and having a horizontal row of openings each located respectively opposite said drums to display a word through the row of openings, a row of slides respectively aligned with each drum and slidably supported by the forward portion of said frame in side-by-side relationship, a series of cards having only pictures of objects thereon having names capable of being spelled by letters on said drums, perforations in said cards in predetermined spaced relation to the edge of the card which is parallel to said shaft when the card is mounted in said frame, projections on said slides adjacent one end respectively engageable with said perforations in said cards when a card is slidably inserted in said machine, stop means on the opposite ends of said slides, and rotation limiting means on said drums corresponding to letters on said drums and engageable with said stop means on the opposite end portions of said slides to stop rotation of said drums respectively with a letter on each drum which forms part of the word corresponding to the picture on the inserted card, means to rotate said drums upon said shaft in one direction to engage said rotation limiting means with said stop means on said slides, and means to rotate said drums in the opposite direction to starting position.

2. The spelling machine according to claim 1 further characterized by said drums each having an additional stop means engageable with similarly positioned means on said housing to stop said reverse rotation thereof when the starting position is reached.

3. The spelling machine according to claim 2 in which said additional stop means are on the interior of said drums and said rotation limiting means are on said drums inwardly from the periphery thereof.

4. The spelling machine according to claim 1 in which said rotation limiting means on said drums comprise a snail member having stepped portions respectively corresponding to the letters on the periphery thereof and progressively spaced successively greater radii from the axis of said shaft between opposite ends of said snail member.

5. The spelling machine according to claim 4 in which said frame has substantially horizontal parallel guideways for said slides in the forward portion thereof, each slide having resilient means supporting the lug on the slide in an upward position from which it is depressed by a card upon insertion in said machine, whereby said resilient means urges the lug into the opening in a card to be engaged by said lug and insures interengagement of said slides with a card, and further movement of said card into the machine positively moves said slides inwardly with it, fixed stop means in said machine for said card, whereupon said stop means on said opposite ends of said slides will be in position to stop rotation of said drums respectively as the movement limiting means thereon engages said stop means, and return means engaging said slides to return them automatically to initial starting position when the card is removed from the machine.

6. The spelling machine according to claim 5 in which said machine is further provided with lock means between said slides and drums operable to prevent return of said slides to starting position until said drums have been reversely rotated to initial starting position.

7. The spelling machine according to claim 6 in which said drums comprise a cylindrical rim and said lock means comprising lateral projections on a slideable tray for said cards insertable through a notch in the cylindrical rim of said drums when a card moves said slides inwardly and engageable with the inner surface of said cylindrical rim of the drum to prevent withdrawal of said slides until the drums have been reversely moved to initial starting position, and cover means for the portion of said cards having said openings therein preventing removal of said cards after insertion thereof to engagement with said fixed stop means within said machine.

8. The spelling machine according to claim 1 in which said drums have hubs frictionally-engaging said shaft, said shaft being rotatably supported by said frame within bearings in side members of said frame for rotation in forward and return directions relative to the desired movements of said drums, whereby when the drums are forwardly rotated and stopped sequentially by engagement of the rotation-limiting means thereof with said stop means on said slides continued forward rotation of said shaft can continue until all drums have been stopped to display letters forming the name of the article on the picture on the card.

9. The spelling machine according to claim 1 further including a hand crank on one end of said shaft to effect rotation of said drums selectively in forward and return directions.

10. The spelling machine according to claim 1 in which said cards each have a different picture on opposite sides and perforations respectively pertaining to each picture are formed in said cards respectively closer to one edge than the other, whereby said cards are reversible for insertion in the machine in such manner that the perforations pertaining to the picture which is uppermost will be effective to control the actuation of said slides to spell the name of the object on said uppermost picture.

11. The spelling machine according to claim 1 further characterized by said drums having circular rims and having spaces between said drums to permit insertion therethrough of said stop means on said opposite ends of said slides for engagement thereof with said rotation limiting means on the interior of said drums inwardly from said rims thereof and comprising a snail member having stepped portions respectively engageable by said stop means on said slides, a tray slidably supported by the forward portion of said frame above and parallel to said row of slides and provided with a recess complementary in shape to said cards to support the same for movement into said machine and thereby also effect similar movement of said slides into the housing of the machine by engagement thereof with a card on said tray, and lock means for said tray comprising transversely spaced projections along the forward end thereof and having lateral locking members thereon respectively insertable through notches on the rims of said drums when the same are in starting position and operable upon rotary movement of said drums to prevent withdrawal of said slide and card thereon from the inserted position thereof until the drums are returned to starting position.

12. The spelling machine according to claim 11 further characterized by said opposite ends of said slides being insertable through said spaces between said drums and said snail members extending laterally beyond the rims of said drums for engagement of the stepped portions thereon by said stop means on said opposite ends of said slides.

13. The spelling machine according to claim 12 in which said opposite ends of said slides when projected inwardly are disposed within said spaces between said drums and are radially inward from the rims on said drums toward the shaft for said drums a distance radially less than the radial distance of the radially outermost end of snail when said drums are in initial starting position, whereby said outermost end of said snail engages the slide associated therewith to prevent rotation of said drums in one direction, and said drums being rotatable upon said shaft in forward operative direction from said starting position to effect spelling a word as rotated by turning of said shaft in said one direction, and said drums being rotatable in the opposite direction to restore the drums to starting position determined by the engagement of said outermost ends of said snail members with said opposite ends of said slides to equally stop such rotation of all the drums.

14. The spelling machine according to claim 13 in which all of said drums have hubs through which said shaft extends, said hubs having frictional means engaging said shaft and the drums being rotatable with said shaft in forward direction to effect spelling a word by said drums until the stepped portions of said snails of said drums respectively engage the stop means of said slides, whereupon rotation of said shaft in forward direction may continue by slippage of said hubs until rotation of all drums has been stopped by said stop means on said slides, and rotation of said shaft in the reverse returning direction being achieved by said shaft turning in said direction until the drums have been restored respectively to starting position through slippage of said hubs until all drums have reached starting position.

15. The spelling machine according to claim 13 further including a crank upon one end of said shaft, and one member of sound-generating means carried by said crank and a second member of said means supported stationarily by said machine adjacent said crank and engageable by said one member to effect a rachetlike noise for amusement to children.

16. The spelling machine according to claim 11 further including return means connected to said slides and operable to return the same from projected positions to starting positions within said housing, said return means being energized by projection of said slides into the inserted operative position thereof.

17. The spelling machine according to claim 16 further including a forward portion of said housing extending over the forward portion of said frame to cover said tray when the latter is fully inserted into operative position in said housing with a card in said recess, and releasable latch means including coengageable portions respectively on said forward portion of said housing and outer end of said tray to hold said tray in said inserted position against the force of said return means for said slides.

* * * * *